(12) United States Patent
Twist

(10) Patent No.: US 8,985,160 B2
(45) Date of Patent: *Mar. 24, 2015

(54) CORRUGATED METAL PIPE

(71) Applicant: W.E. Hall Company, Inc., Newport Beach, CA (US)

(72) Inventor: Jordan Twist, Newport Beach, CA (US)

(73) Assignee: W.E. Hall Company, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/024,866

(22) Filed: Sep. 12, 2013

(65) Prior Publication Data
US 2014/0014221 A1  Jan. 16, 2014

Related U.S. Application Data

(63) Continuation of application No. 12/849,641, filed on Aug. 3, 2010, now Pat. No. 8,573,260.

(51) Int. Cl.
| | |
|---|---|
| *F16L 11/16* | (2006.01) |
| *F16L 9/06* | (2006.01) |
| *E03F 3/04* | (2006.01) |
| *F16L 9/16* | (2006.01) |

(52) U.S. Cl.
CPC ... *F16L 9/06* (2013.01); *E03F 3/04* (2013.01); *F16L 9/165* (2013.01)
USPC ............ 138/135; 138/122; 138/134; 138/154

(58) Field of Classification Search
USPC ................. 138/135, 134, 122, 154, 129, 173; 72/49; 405/127
See application file for complete search history.

(56) References Cited

U.S. PATENT DOCUMENTS

| | | |
|---|---|---|
| 127,438 A | 6/1872 | Stephens |
| 192,079 A | 6/1877 | Noble |
| 848,238 A | 3/1907 | Greenfield |
| 887,084 A | 5/1908 | Fulton |
| 901,534 A | 10/1908 | Hamlin |
| 907,136 A | 12/1908 | Farrington et al. |
| 925,317 A | 6/1909 | Eldred |
| 1,049,544 A | 1/1913 | Smith |
| 1,263,340 A | 4/1918 | Silk |
| 1,270,579 A | 6/1918 | Witzenmann |
| 1,340,818 A | 5/1920 | Brinkman |
| 1,453,220 A | 4/1923 | Witzenmann |
| 1,570,886 A | 1/1926 | Fulton et al. |
| 1,644,823 A | 10/1927 | Fay |
| 1,677,523 A | 7/1928 | Herbst et al. |

(Continued)

*Primary Examiner* — Patrick F Brinson
(74) *Attorney, Agent, or Firm* — Stetina Brunda Garred & Brucker

(57) ABSTRACT

A metal pipe of single piece includes a wall formed of a single corrugated metal sheet. The sheet has opposing first and second edges extending longitudinally along the sheet. The wall includes a seam formed by abutting portions of the first and second edges. The seam extends helically about and along a length of the wall. The wall has an interior wall side and an opposing exterior wall side. The metal sheet has an interior wall side and an opposing exterior wall side. The interior wall side defines an inner wall surface of the wall, and the exterior wall side defines an outer wall surface of the wall. The sheet has a sinusoidal cross-sectional profile defining 5 corrugation peaks at the inner wall surface and 5 corrugation peaks at the outer wall surface. The sheet has a flattened sheet width of approximately 27¼ inches and a finished sheet width of approximately 23 inches.

10 Claims, 3 Drawing Sheets

(56) References Cited

U.S. PATENT DOCUMENTS

| | | |
|---|---|---|
| 1,718,468 A | 6/1929 | Leary |
| 1,761,034 A | 6/1930 | Gillett |
| 1,806,920 A | 5/1931 | See |
| 1,885,587 A | 11/1932 | Burton |
| 2,022,694 A | 12/1935 | Stone |
| 2,068,022 A | 1/1937 | Hammel |
| 2,094,691 A | 10/1937 | Williams |
| 2,118,060 A | 5/1938 | Stone |
| 2,135,447 A | 8/1938 | Jacobson |
| 2,180,091 A | 11/1939 | Norton et al. |
| 2,330,966 A | 10/1943 | Gottwald et al. |
| 2,686,747 A | 8/1954 | Wurtz et al. |
| 2,713,381 A | 7/1955 | Seck |
| 2,739,089 A | 3/1956 | Hageltorn |
| 2,758,366 A | 8/1956 | Voetelink |
| 2,841,183 A | 7/1958 | Rejeski |
| 2,859,061 A | 11/1958 | Reid |
| 2,898,634 A | 8/1959 | Alderfer |
| 2,915,110 A | 12/1959 | Ferguson et al. |
| 3,085,596 A | 4/1963 | Rejeski |
| 3,126,306 A | 3/1964 | Sherman |
| 3,199,541 A | 8/1965 | Richitelli |
| 3,219,368 A | 11/1965 | Crumpler |
| 3,224,814 A | 12/1965 | Fisher |
| 3,240,177 A | 3/1966 | Habdas |
| 3,247,692 A | 4/1966 | Davis |
| 3,255,516 A | 6/1966 | Sommer |
| 3,263,321 A | 8/1966 | Lombardi |
| 3,273,600 A | 9/1966 | Swan |
| 3,286,341 A | 11/1966 | Miller |
| 3,330,303 A | 7/1967 | Fochler |
| 3,331,400 A | 7/1967 | Vilkaitis |
| 3,402,086 A | 9/1968 | Smith et al. |
| 3,422,856 A | 1/1969 | Hunter et al. |
| 3,435,852 A | 4/1969 | Trihey |
| 3,442,297 A | 5/1969 | Wesesku |
| 3,455,584 A | 7/1969 | Henrickson |
| 3,474,514 A | 10/1969 | Lombardi |
| 3,478,770 A | 11/1969 | Osborn et al. |
| 3,491,825 A | 1/1970 | Peterson et al. |
| 3,550,639 A | 12/1970 | Okuda |
| 3,572,394 A | 3/1971 | Davis |
| 3,621,884 A | 11/1971 | Trihey |
| 3,637,224 A | 1/1972 | Triplett et al. |
| 3,656,514 A | 4/1972 | Kafka |
| 3,721,597 A | 3/1973 | Colburn |
| 3,722,075 A | 3/1973 | Fay |
| 3,731,711 A | 5/1973 | Bauer |
| 2,417,676 A | 3/1974 | Chernack |
| 3,809,223 A | 5/1974 | Kendall |
| 3,834,009 A | 9/1974 | Iida et al. |
| 3,857,159 A | 12/1974 | Davis |
| 3,865,146 A | 2/1975 | Meserole |
| 3,868,433 A | 2/1975 | Bartz et al. |
| 3,872,893 A | 3/1975 | Roberts |
| 3,877,136 A | 4/1975 | Groch et al. |
| 4,029,129 A | 6/1977 | Harper |
| 4,121,624 A | 10/1978 | Chen |
| 4,129,152 A | 12/1978 | Davis |
| 4,161,194 A | 7/1979 | Nyssen |
| 4,161,811 A | 7/1979 | Nyssen |
| 4,167,645 A | 9/1979 | Carey |
| 4,304,266 A | 12/1981 | Kutnyak et al. |
| 4,312,902 A | 1/1982 | Murase et al. |
| 4,326,561 A | 4/1982 | Kutnyak |
| 4,333,221 A | 6/1982 | Hayashi |
| 4,337,800 A | 7/1982 | Carlson et al. |
| 4,355,448 A | 10/1982 | Ezaki |
| 4,360,227 A | 11/1982 | Bridges |
| 4,383,555 A | 5/1983 | Finley |
| 4,420,019 A | 12/1983 | Dillon |
| 4,443,019 A | 4/1984 | Ishido et al. |
| 4,472,475 A | 9/1984 | Decroix |
| 4,486,484 A | 12/1984 | Shafer |
| 4,509,560 A | 4/1985 | Shafer |
| 4,575,400 A | 3/1986 | Ueda et al. |
| 4,606,953 A | 8/1986 | Suzuki et al. |
| 4,630,650 A | 12/1986 | Davis |
| 4,689,174 A | 8/1987 | Lupke |
| 4,715,609 A | 12/1987 | Mino et al. |
| 4,763,830 A | 8/1988 | Davis |
| 4,790,686 A | 12/1988 | Christ et al. |
| 4,791,800 A | 12/1988 | Alexander |
| 4,830,898 A | 5/1989 | Smith |
| 4,838,317 A | 6/1989 | Andre et al. |
| 4,852,616 A | 8/1989 | Holcomb |
| 4,865,210 A | 9/1989 | Brainard, II |
| 4,926,909 A | 5/1990 | Salinas |
| 4,964,440 A | 10/1990 | Andre et al. |
| 5,046,531 A | 9/1991 | Kanao |
| 5,074,138 A | 12/1991 | Miller |
| 5,158,115 A | 10/1992 | Miller |
| 5,300,336 A | 4/1994 | Wong et al. |
| 5,316,606 A | 5/1994 | Andre |
| 5,356,679 A | 10/1994 | Houis et al. |
| 5,411,619 A | 5/1995 | Sundqvist et al. |
| 5,429,397 A | 7/1995 | Kanao |
| 5,454,402 A | 10/1995 | Andre et al. |
| 5,480,505 A | 1/1996 | Andre |
| 5,980,670 A | 11/1999 | Andre |
| 6,009,912 A | 1/2000 | Andre |
| 6,418,971 B1 | 7/2002 | Foti et al. |
| 8,555,932 B2 | 10/2013 | Twist |
| 8,573,260 B2 | 11/2013 | Twist |

CORRUGATED METAL PIPE

CROSS-REFERENCE TO RELATED APPLICATIONS

The present application is a continuation of U.S. patent application Ser. No. 12/849,641 entitled CORRUGATED METAL PIPE filed Aug. 3, 2010, which is a continuation of U.S. patent application Ser. No. 12/604/005 filed Oct. 22, 2009, the entirety of the disclosures of which are expressly incorporated herein by reference.

STATEMENT RE: FEDERALLY SPONSORED RESEARCH/DEVELOPMENT

Not Applicable

BACKGROUND

The present invention relates in general to pipes, and more particularly, to corrugated metal pipes.

Corrugated metal pipe is used extensively in flood control, drainage and sewer systems because of its economic value strength and durability. The pipe is usually fabricated in 20 foot and 24 foot sections; however sections in other lengths are available. Widely used pipe diameters may range from 6 to 216 inches and typical wall thicknesses are 0.052 inches (18 gauge), 0.064 inches (16 gauge), 0.079 inches (14 gauge), 0.109 inches (12 gauge), 0.138 inches (10 gauge) and 0.168 inches (8 gauge).

Corrugated metal pipe derives most of its inherent strength from the corrugations formed into the metal sheets at the time of fabrication. Helical corrugated pipe is corrugated pipe with helical corrugations, fabricated from corrugated metal sheet, with a continuous helical seam. Corrugated metal sheet is a mill product in sheet or coil form for fabricating helical corrugated pipe products. Corrugations commonly used for metal pipes are circular arcs connected by tangents, and are described by pitch and depth. Pitch is measured at right angles to the corrugations from crest to crest on a same side of a pipe sheet. Depth of a corrugation is measured from a crest of a corrugation to the lowest portion of an adjoining valley, both measured on a same side of a pipe sheet. A corrugation is named using its pitch and depth as "pitch by depth."

A standard "3×1" corrugation profile features a 3 inch pitch and a 1 inch depth. Seven (7) corrugations are included on each side of the metal sheet. The corrugated metal sheet is formed from a flattened sheet width is about 27 inches (specifically 27¼ inches). The finished (corrugated) sheet width is 21' (+−½ inch) with a lock seam. A standard "5×1" corrugation profile features a 5 inch pitch and a 1 inch depth. Six (6) corrugations are included on each side of the metal sheet. The corrugated metal sheet is formed from a flattened sheet width is about 34 inches (specifically 33⁵⁄₁₆ inches). The finished (corrugated) sheet width is 30" (+−½ inch) with a lock seam.

For large pipe diameters (over 48 inches), a 3×1 corrugation profile is the established industry profile. The traditional 5×1 corrugation profile utilizes approximately 13% less material that the 3×1 corrugation profile. However, for engineering purposes, pipes with 3×1 and 5×1 corrugation profiles are considered to have the similar enough structural properties to be equal products. Nonetheless, pipe fabricators must stock both metal sheets with 27 and 34 inch flat sheet widths to accommodate desired the 3×1 and 5×1 corrugation profiles.

Accordingly, there exists a need in the art for an improved corrugated pipe arrangement in comparison to the prior art.

BRIEF SUMMARY

According to an aspect of the present invention, there is provided a metal pipe of single piece includes a wall formed of a single corrugated metal sheet. The sheet has opposing first and second edges extending longitudinally along the sheet. The wall includes a seam formed by abutting portions of the first and second edges. The seam extends helically about and along a length of the wall. The wall has an interior wall side and an opposing exterior wall side. The metal sheet has an interior wall side and an opposing exterior wall side. The interior wall side defines an inner wall surface of the wall, and the exterior wall side defines an outer wall surface of the wall. The sheet has a sinusoidal cross-sectional profile defining 5 corrugation peaks at the inner wall surface and 5 corrugation peaks at the outer wall surface. The sheet has a flattened sheet width of approximately 27¼ inches and a finished sheet width of approximately 23 inches.

According to various embodiments, the finished sheet width may be between 21½ inches and 23½ inches. The seam may be a lock seam. The sheet may have a corrugation pitch of approximately 4½ inches. The sheet may have a corrugation height between adjacent corrugations of approximately 1 inch. In this regard, in this embodiment, the corrugation profile would be "4½×1". This is roughly a "5×1" corrugation profile. This is significant in that a corrugated pipe fabricator can stock just sheets with sheet widths of 27¼ inch and still be able to produce sheets either "3×1" or a roughly "5×1" corrugation profile. In addition, the wall may define a pipe diameter between 36 inches and 216 inches. The wall may be cylindrical shaped. The metal sheet may have a thickness between 18 gauge and 8 gauge.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the presently preferred embodiment of the invention, and is not intended to represent the only form in which the present invention may be constructed or utilized. Reference throughout the detailed description to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this detailed description are not necessarily all referring to the same embodiment. The following description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments. In the following description, numerous specific details are shown to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described to avoid obscuring aspects of the invention. It is further understood that the use of relational terms such as first and second, and the like are used solely to distinguish one from another entity without necessarily requiring or implying any actual such relationship or order between such entities.

Figure 1:
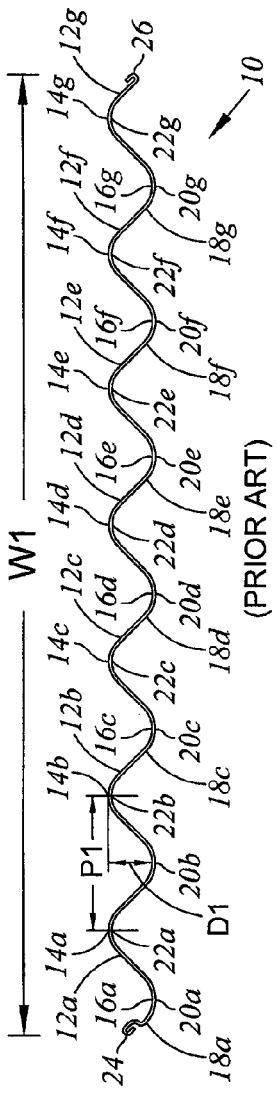
FIG. 1 is a cross sectional view of a prior art "3×1" corrugated metal sheet.

Referring now to FIG. 1, there is depicted a cross sectional view of a prior art "3×1" corrugated metal sheet 10. A standard "3×1" corrugation profile features a 3 inch pitch (P1) and a 1 inch depth (D1). The metal sheet 10 includes seven (7) corrugations 12a-g on one side and seven (7) corrugations 18a-g on an opposing side. Each of the corrugations 12a-g respectively includes corrugation peaks 14a-g. Adjacent to each of the corrugations 12a-g respectively are corrugation valleys 16a-g. Each of the corrugations 18a-g respectively includes corrugation peaks 20a-g. Adjacent to each of the corrugations 18a-g respectively are corrugation valleys 22a-g. The metal sheet 10 has first and second edges 24, 26. In the embodiment depicted, each of the first and second edges 24, 26 are bent back upon themselves in a lock seam configuration. The corrugated metal sheet 10 is formed from a flattened sheet width is about 27 inches (specifically 27¼ inches). The finished (corrugated) sheet width (W1) is 21" (+−½ inch) with a lock seam.

Figure 2:
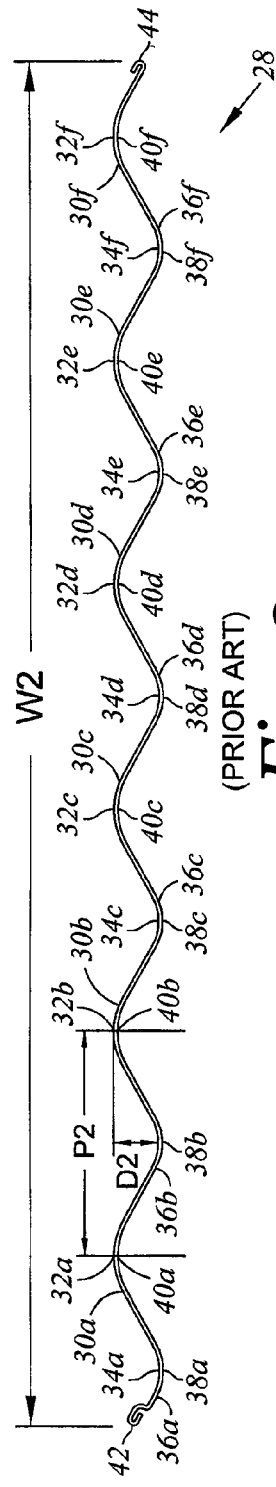
FIG. 2 is a cross sectional view of a prior art "5×1" corrugated metal sheet.

Referring now to FIG. 2 there is depicted a cross sectional view of a prior art "5×1" corrugated metal sheet 28. A standard "5×1" corrugation profile features a 5 inch pitch (P2) and a 1 inch depth (D2). The metal sheet 28 includes six (6) corrugations 30a-f on one side and six (6) corrugations 36a-g on an opposing side. Each of the corrugations 30a-f respectively includes corrugation peaks 32a-f. Adjacent to each of the corrugations 30a-f respectively are corrugation valleys 34a-f. Each of the corrugations 36a-f respectively includes corrugation peaks 38a-f. Adjacent to each of the corrugations 36a-f respectively are corrugation valleys 40a-f. The metal sheet 10 has first and second edges 42, 44. In the embodiment depicted, each of the first and second edges 42, 44 are bent back upon themselves in a lock seam configuration. The corrugated metal sheet 28 is formed from a flattened sheet width is about 34 inches (specifically 33 5/16 inches). The finished (corrugated) sheet width (W2) is 30" (+−½ inch) with a lock seam.

Figure 3:
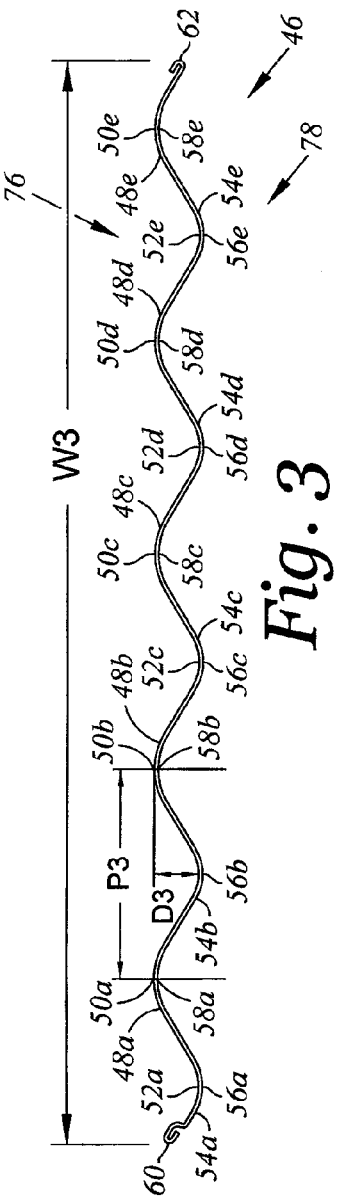
FIG. 3 is a cross sectional view of a corrugated metal sheet utilized in the fabrication of corrugated metal pipe according to an aspect of the invention.

Referring now to FIG. 3 there is depicted a cross sectional view of a corrugated metal sheet 46 utilized in the fabrication of corrugated metal pipe according to an aspect of the invention. The metal sheet 46 includes five (5) corrugations 48a-e on one side and five (5) corrugations 54a-e on an opposing side. Each of the corrugations 48a-e respectively includes corrugation peaks 50a-e. Adjacent to each of the corrugations 48a-e respectively are corrugation valleys 52a-2. Each of the corrugations 54a-e respectively includes corrugation peaks 56a-e. Adjacent to each of the corrugations 54a-e respectively are corrugation valleys 58a-e. The metal sheet 46 has first and second edges 60, 62. In the embodiment depicted, each of the first and second edges 60, 62 are bent back upon themselves in a lock seam configuration. The corrugation profile of the metal sheet 46 is characterized by a pitch (P3) and a depth (D3). The corrugated metal sheet 46 has a finished (corrugated) sheet width (W3) of approximately 23 inches with a lock seam. As used herein approximately 23 inches refers to 23 inches +−manufacturing tolerances or specifications. In this regard, a 1½ lower tolerance and a ½ inch upper tolerance would result in approximately 23 inches being used herein to mean between 21½ inches and 23½ inches. The corrugated metal sheet has a flattened sheet width of approximately 27¼ inches. As used herein approximately 27¼ inches refers to 27¼ inches +−manufacturing tolerances or specifications. In this regard, a ½ inch tolerance would result in approximately 27¼ inches being used herein to mean be between 26¾ inches and 27¾ inches.

Figure 4:
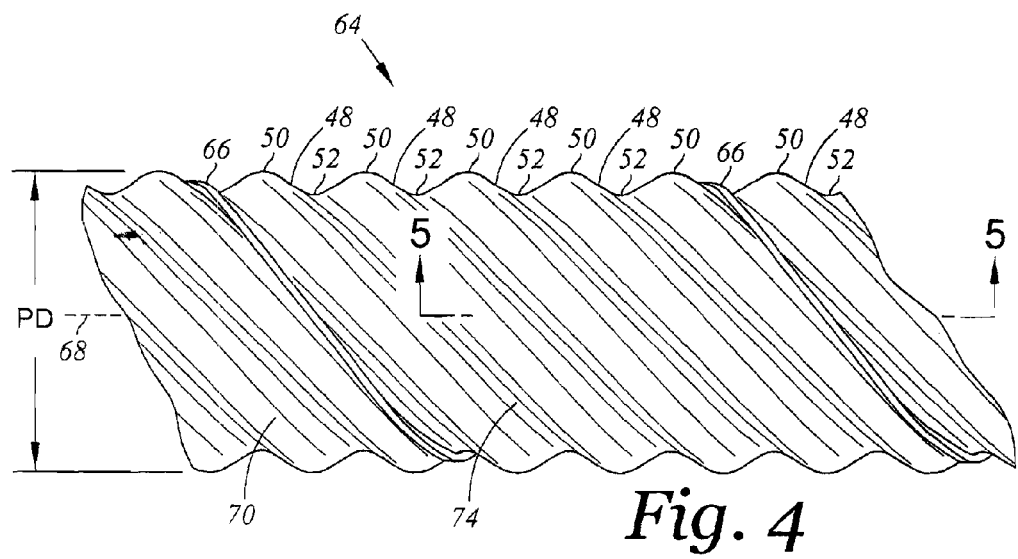
FIG. 4 is a side view of a corrugated metal pipe in accordance with an aspect of the invention.
Figure 5:
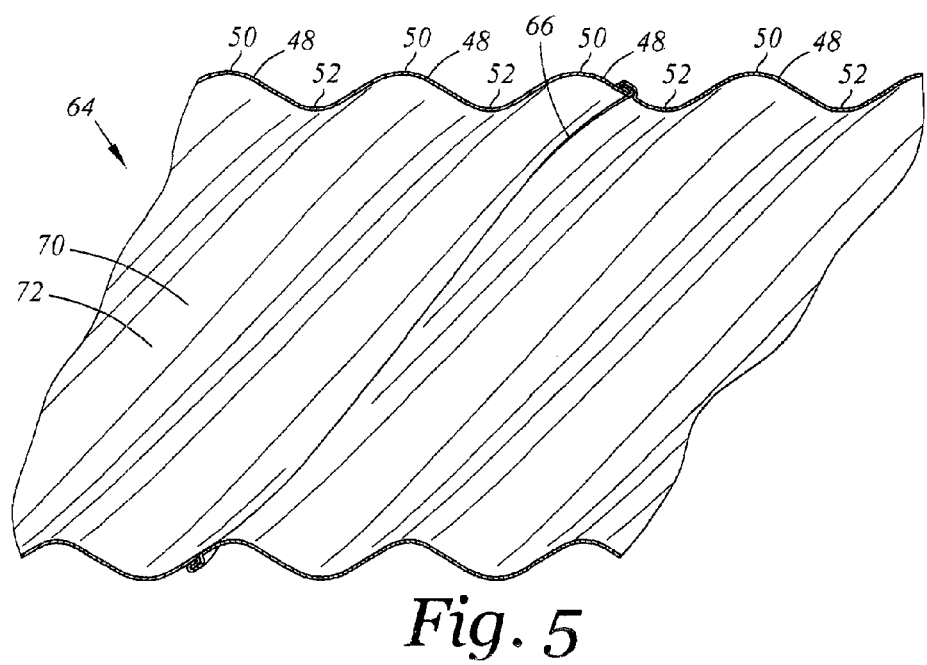
FIG. 5 is a cross sectional view as viewed from the axis 5-5 of FIG. 4.
Figure 6:
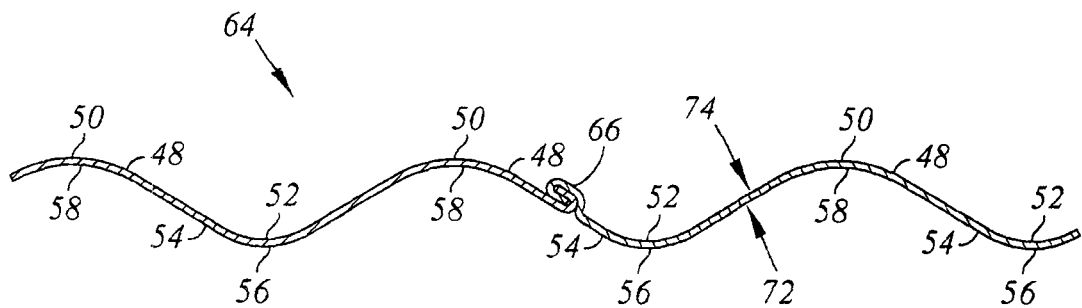
FIG. 6 is an enlarged cross sectional view of a portion of a length of corrugated metal pipe constructed in accordance with an aspect of the present invention.
Figure 7:
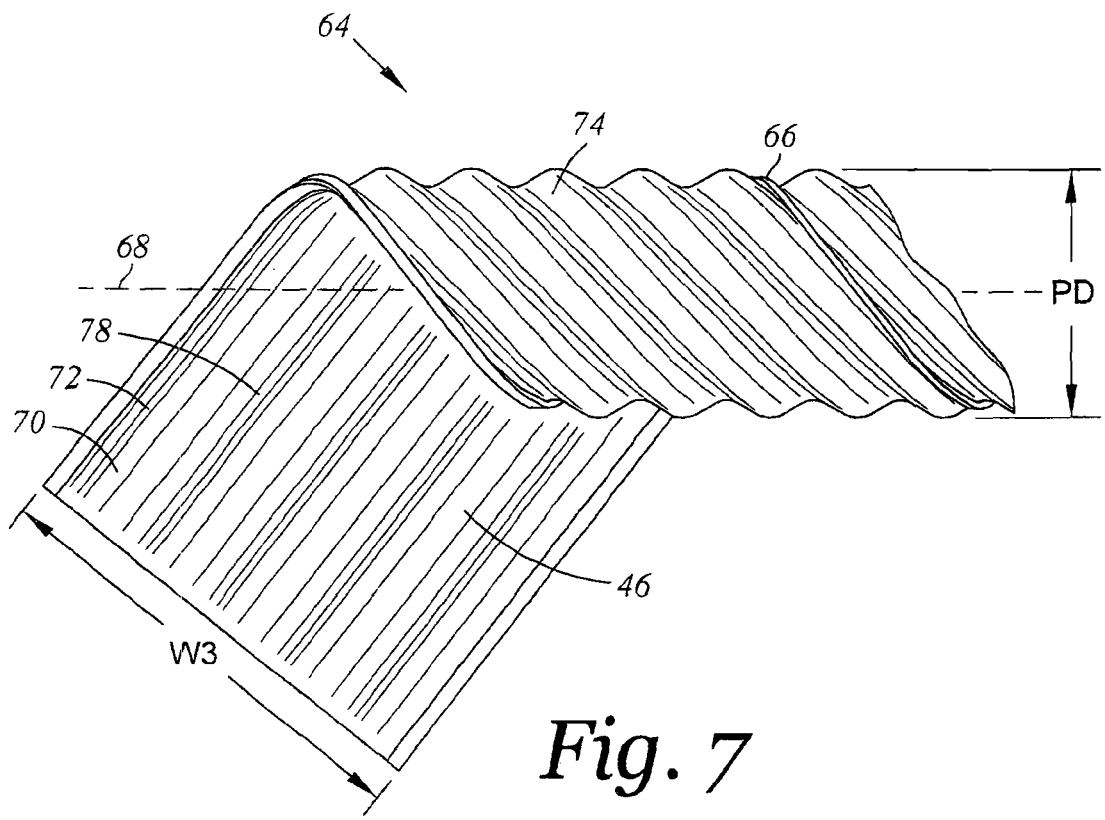
FIG. 7 illustrates a section of corrugated metal pipe during fabrication from the corrugated metal sheet.

Referring now to FIG. 4 there is depicted a side view of a corrugated metal pipe 64 in accordance with an aspect of the invention. FIG. 5 is a cross sectional view as viewed from the axis 5-5 of FIG. 4. FIG. 6 is an enlarged cross sectional view of a portion of a length of the corrugated metal pipe 64 constructed in accordance with an aspect of the present invention. FIG. 7 illustrates a section of the corrugated metal pipe 64 during fabrication from the corrugated metal sheet 46. As is illustrated, the metal sheet 46 may be "feed" towards the forming metal pipe 64.

According to an aspect of the invention, the metal pipe 64 includes a wall 70. The wall 70 is formed from of a single corrugated metal sheet, such as the metal sheet 46. The metal sheet has the opposing first and second edges 60, 62 extending longitudinally along the sheet 46. The wall 70 includes a seam, such as lock seam 66, formed by abutting portions of the first and second edges 60, 62. The seam 66 extends helically about and along a length of the wall 70. The sheet 46 has an interior wall side 78 and an opposing exterior wall side 76. The interior wall side 78 defines an inner wall surface 72 of the wall 70, and the exterior wall side 76 defines an outer wall surface 74 of the wall 70. The sheet 46 has a sinusoidal cross-sectional profile defining 5 corrugation peaks at the inner wall surface 72 and 5 corrugation peaks at the outer wall surface 74. The sheet 46 has a flattened sheet width of approximately 27¼ inches and a finished sheet width of approximately 23 inches.

According to various embodiments, the sheet 46 may have a corrugation pitch (P3) of approximately 4½ inches. The sheet 46 may have a corrugation depth (D3) between adjacent corrugations of approximately 1 inch. In this regard, in this embodiment, the corrugation profile would be "4½×1". This is roughly a "5×1" corrugation profile. This is significant in that a corrugated pipe fabricator can stock just sheets with sheet widths of 27¼ inch and still be able to produce corrugated metal sheets with either "3×1" or a roughly "5×1" corrugation profiles. As a result inventory costs may be significantly reduced by avoiding such double inventory requirements because the metal sheets with flattened sheet width of 34 inches (for the traditional "5×1" profile would no longer be needed).

The wall 70 is defined by a longitudinal axis 68. The wall 70 defines a pipe diameter (PD) with reference to the longitudinal axis 68. The pipe diameter (PD) may be between 36 inches and 216 inches. In the embodiment illustrated, the metal pipe 64 is cylindrical shaped. The sheet 46 may have a thickness between 18 gauge and 8 gauge. The metal utilized to fabricate the metal sheet 46 may be chosen from any of those which are well known to one of ordinary skill in the art, such as steel. Further, the metal sheet 46 may be surface coated as may be desired.

The particular manufacturing processes for forming the metal sheet 46 with the corrugation profile may be chose from any of those processes which are well known to one of ordinary skill in the art. Moreover, the particular manufacturing processes for forming the metal pipe 64 from the metal sheet 46 may be chose from any of those processes which are well known to one of ordinary skill in the art. While the seam 66 is depicted as a lock seam, it is contemplated other attachment or bonding arrangements, such as welding may be utilized, may be selected from those which are well known to one of ordinary skill in the art.

It is contemplated that a corrugating bed of a standard metal sheet production mill is 29½ inches (+−a margin depending up the particular mill used). A metal sheet with a traditional "5×1" corrugation profile, begins with a flattened sheet width of 34 inches (+−manufacturing tolerances). However, this is wider than the corrugating bed of the standard metal sheet production mill. As such (in the absence of the present invention), a fabricator would either have to width of the corrugating bed of the standard metal sheet production mill or purchase a new mill with a wider. The corrugation profile of the metal sheet 46 of the present invention is configured to fit a corrugating bed with a width of 29½. This allows a fabricator to produce corrugated metal sheets with either "3×1" or a roughly "5×1" corrugation profiles using their standard metal sheet production mill.

From an engineering point of view the metal sheet 46 with its corrugation profile utilizes approximately 10% less material than the traditional "3×1" profile (the "3×1" corrugation profile is the established industry profile). However, the structural strength characteristics of the "3×1" and "5×1" corrugation profiles are considered similar enough to be equal products. A metal sheet with a traditional "5×1" corrugation profile utilizes approximately 13% less material than a metal sheet with a "3×1" corrugation profile, and the traditional 5×1 corrugation profile product thus has a competitive advantage over "3×1" corrugation profile products. The metal sheet 46 with its corrugation profile utilizes approximately 10% less material than a metal sheet with a "3×1" corrugation profile (making it more competitive against the traditional "5×1" corrugation products) while utilizing a single inventory of flattened metal sheets with the width of 27 inches.

Moreover, given the metal sheet 46 utilizes approximately 3% more material than the traditional "5×1" corrugation profile products, such metal sheet 46 is contemplated to be slightly structurally stronger. Advantageously, the corrugation profile of the metal sheet 46 of the present invention is contemplated to fall within present engineering tolerances of both ASTM and AASHTO associated with the traditional "5×1" corrugation profile products. In this regard, it is contemplated that the metal sheet 46 may be utilized as a direct substitute for traditional "3×1" or "5×1" corrugation profile products.

What is claimed is:

1. A metal pipe of single piece construction comprising:
   a wall formed of a corrugated metal sheet, the sheet having opposing first and second edge regions extending longitudinally along the sheet, the wall including a seam formed by abutting portions of the first and second edge regions, the seam extending helically along a length of the wall, the metal sheet having an inner wall surface and an opposing outer wall surface of the wall, the sheet having a cross-sectional profile defining only 5 corrugation peaks at the inner wall surface and only 5 corrugation peaks at the outer wall surface, each corrugation peak residing between two adjacent sloped sections.

2. The metal pipe of claim 1 wherein the sheet includes a flattened sheet width of approximately 27¼ inches and a finished sheet width of between 21½ inches and 23½ inches.

3. The metal pipe of claim 1 wherein the seam is a lock seam.

4. The metal pipe of claim 1 wherein the sheet has a corrugation pitch of approximately 4½ inches.

5. The metal pipe of claim 1 wherein the sheet has a corrugation depth between adjacent corrugations of approximately 1 inch.

6. The metal pipe of claim 1 wherein the wall defines a pipe diameter between 36 inches and 216 inches.

7. The metal pipe of claim 1 wherein the wall is cylindrical shaped.

8. The metal pipe of claim 1 wherein the metal sheet has a thickness between 18 gauge and 8 gauge.

9. The metal pipe of claim 2 wherein the sheet includes a finished sheet width of approximately 23 inches.

10. The metal pipe of claim 1, wherein the seam is positioned between a corrugation peak at the inner wall surface and a corrugation peak at the outer wall surface.

* * * * *